United States Patent [19]
Ninomiya et al.

[11] Patent Number: 5,525,288
[45] Date of Patent: Jun. 11, 1996

[54] METHOD OF MANUFACTURING A HOSE HAVING AN EXPANDED PORTION AND A COMPRESSION FORMED PORTION

[75] Inventors: Fujio Ninomiya; Tetsuya Fujii; Shinji Ito; Hiroyuki Mori, all of Nakashima-gun, Japan

[73] Assignee: Toyoda Gosei Co., Ltd., Aichi, Japan

[21] Appl. No.: 252,001

[22] Filed: May 31, 1994

[30] Foreign Application Priority Data

Jun. 22, 1993 [JP] Japan ..................... 5-150725

[51] Int. Cl.$^6$ ............... B29C 43/22; B29C 59/00
[52] U.S. Cl. ............ 264/506; 264/523; 264/531; 264/533; 264/535
[58] Field of Search ............. 264/506, DIG. 52, 264/523, 535, 531, 534, 533; 425/525

[56] References Cited

U.S. PATENT DOCUMENTS

| | | | |
|---|---|---|---|
| 2,897,840 | 8/1959 | Roberts et al. | 138/56 |
| 2,967,563 | 1/1961 | Huff et al. | 154/8 |
| 2,983,961 | 5/1961 | Titterton et al. | 18/56 |
| 3,028,290 | 4/1962 | Roberts et al. | 156/143 |
| 4,119,394 | 10/1978 | Cary . | |

FOREIGN PATENT DOCUMENTS 3-119691   12/1991   Japan .
5-57812    3/1993    Japan .

Primary Examiner—Jan H. Silbaugh
Assistant Examiner—Robin S. Gray
Attorney, Agent, or Firm—Cushman Darby & Cushman

[57] ABSTRACT

A method of manufacturing a hose having an expanded portion and a compression formed portion, including making the expanded portion and the compression formed portion integral and almost simultaneously. The manufacturing process is simple and easy, and the number of manufacturing steps is reduced and the cost can be reduced. The process forms the expanded portion and the compression formed portion from a tube. A rigid, middle core member is inserted into at least one end portion of the tube. This structure is then mounted between mold sections which have an expanded interior cavity when closed. The mold sections are then closed and the end between the middle core member and the opposing inner surface of the mold sections are compressed and formed. After that, the tube is expanded in the mold to conform the tube to the cavity surface by introducing pressurized fluid into the interior of the tube. The conformed tube is removed from the mold sections as a hose with expanded and compression formed portions.

17 Claims, 3 Drawing Sheets

METHOD OF MANUFACTURING A HOSE HAVING AN EXPANDED PORTION AND A COMPRESSION FORMED PORTION

BACKGROUND OF THE INVENTION

1. Field of the Invention

The present invention relates to a method of manufacturing a hose, having an expanded portion and a compression formed portion, that is particularly suitable for use as an automobile fuel inlet hose.

2. Description of Related Art

Conventional automobile inlet fuel hoses can be formed with an expanded portion such as a bellows tubular portion which allows them to bend easily during installation. In other words, the elongation and the flexibility of the bellows tubular portion are utilized when installing the hose. Also, assembly errors can be absorbed or accommodated by the bellows tubular portion. During operation of the automobile, vibrations can be also absorbed by the bellows tubular portion.

Hoses are generally formed by extrusion. However, it is impractical to make hoses having an expanded bellows portion by extrusion. Therefore, hoses having expanded portions are generally molded, for example, by using injection or blow molding equipment. Such a hose is disclosed, for example, in Japanese Utility Model Laid-open publication No. Hei 03-119691.

Fuel inlet hoses are generally made of two kinds of different materials and can be comprised of a two layered structure or a double tube construction. However, it is not desirable to form a fuel inlet hose having the expanded portion and the two layered structure by using injection molding techniques. That increases the complexity of the manufacturing process, the steps involved and the cost.

Another method for producing a bellows tubular shape uses pressurized fluid. For example, pressurized air is forced into a parison or an extruded tube, and it expands the tube into the mold cavity forcing the tube to conform to the mold cavity surface. Such a method is disclosed, for example, in Japanese Patent Laid-open publication No. Hei 05-57812.

Fuel inlet hoses must be connected to other types of hoses as well as to other members, for example, a pipe, a fuel tank. In such a case, it is desirable to form the tube with structure that will aid or assist its connection to other members. One such structure which will aid in determining when a proper connection is formed, includes setting and positioning parts. Such parts can be formed on the inner surface or on the outer surface of one end portion of the hose, for aiding the setting and positioning of the hose with the other member. Such a hose, having setting and positioning parts, is disclosed, for example, in Japanese Utility Model Laid-open publication No. Hei 03-119691.

It is also desirable to form a tapered guide surface at an open end portion of the inner surface of the hose for guiding the other member when the hose is connected to the other member.

The blow molding manufacturing method, disclosed in Japanese Patent Laid-open publication No. Hei 05-57812, is impractical for forming the inner surface of the hose since it only helps form the outer surface where the hose is expanded. Blow molding is also impractical for making setting and positioning parts.

SUMMARY OF THE INVENTION

The present invention has been developed to overcome the problems associated with the conventional methods described above.

An object of the present invention is to provide a method of manufacturing a hose having an expanded portion and a compression formed portion, and to make the expanded portion and the compression formed portion integrally and almost simultaneously.

Another object of the present invention is to provide a method of manufacturing a hose having expanded and compression formed portions, wherein the manufacturing is simple and easy, and the number of the manufacturing steps is reduced and the cost can be reduced.

In accordance with the invention, the objects are achieved in a hose manufacturing process that forms the expanded portion and the compression formed portion from a tube having a certain cross-sectional shape, for example, round. A rigid, middle core member is inserted into at least one end portion of the tube. This structure is then mounted between mold sections which have an expanded interior cavity when closed. The mold sections are closed for compressing the tube end between the middle core member and the opposing inner surface of the mold sections. Then the tube is expanded in the mold to conform the tube to the cavity surface by introducing pressurized fluid into the interior of the tube.

When the mold sections are closed, during the compression step, the tube end that includes the rigid core member is compressed and formed between the core member and the mold sections. This forms the compression formed portion and at the same time forms protrusions, grooves and a tapered guide surface on an outer surface or an inner surface of the tube. Namely, when grooves exist on an outer surface of the rigid core member, they form protrusions on the inner surface of the tube. Also, when grooves exist on a surface of the each mold section, they form protrusions on the outer surface of the tube.

When pressurized air is introduced into the tube to expand the tube in the mold, the tube conforms to the internal cavity surface of the closed mold. In this case, as the mold has the expanded cavity surface, the tube is conformed to the expanded tubular shape. At that time, if the material of the tube is synthetic resin, the tube is cooled in the mold and is formed to the expanded tubular shape. It is desirable to heat the synthetic resin tube before compressing to allow compressing and expanding to occur easily. If the material of the tube is rubber, the tube is cured in the mold in its expanded tubular shape.

Other objects, features, and characteristics of the present invention, as well as the methods and operation and functions of the related elements of the structure, will become apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENT

A preferred exemplary embodiment of the present invention will now be described referring to the accompanying drawings.

Figure 5:
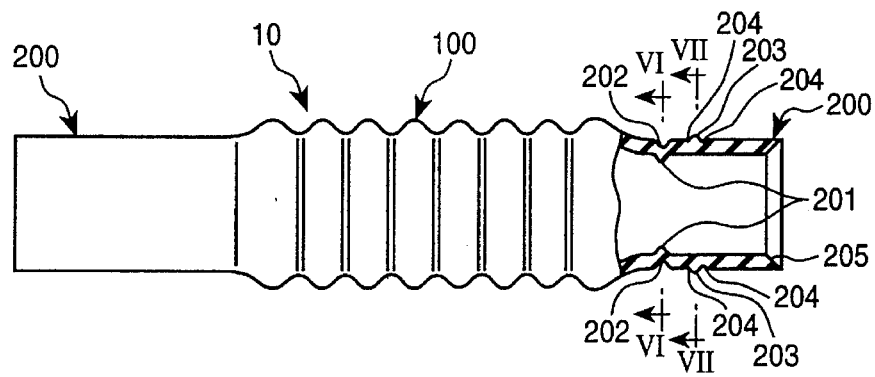
FIG. 5 is a front elevational view, partly in section, of a hose manufactured according to the present invention.
Figure 6:
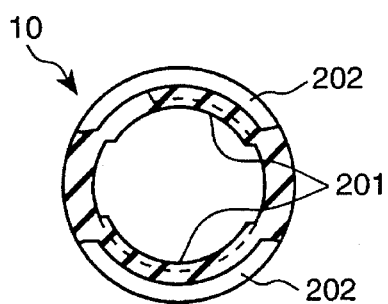
FIG. 6 is a cross-sectional view of the hose taken along a line VI—VI in FIG. 5.
Figure 7:
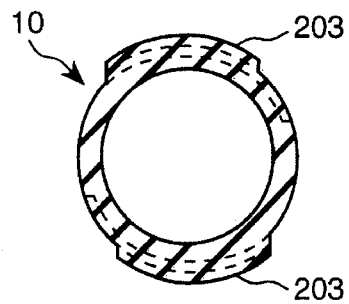
FIG. 7 is a cross-sectional view of the hose taken along a line VII—VII in FIG. 5.

A fuel inlet hose 10, as shown in FIGS. 5 to 7, is formed by the process of the compression. It has an expanded portion, such a bellows tubular portion 100, disposed in an intermediate or central area and extends axially thereof. Compression formed portions 200 are disposed on both end portions. Compression formed portions are formed their shape by the mold. Therefore, hereinafter they are called molded portions 200. A pair of opposing inner ribs 201 are formed on an inner surface of one of the molded portions 200. A pair of grooves 202 and a pair of outer ribs 203 are formed on an outer surface of one of the molded portions 200. Two pairs of shallow grooves 204 are also formed on opposite sides of the outer ribs 203 respectively. Also, tapered guide surface 205 is formed at one open end portion of the inner surface of the fuel inlet hose 10. These ribs 201, 203 and grooves 202, 204 are used in the setting and positioning parts.

The mold, as shown in FIGS. 1 to 4, comprises an upper mold section 40, a lower mold section 41, and middle core members 2 and 3 that provide a rigid support for the compression of the tube ends.

Each mold section 40, 41 has a bellows-like cavity surface 42, a projection 43, and a groove 44 which is formed between protrusions 45, all of which lie on the inner surface of the mold sections, respectively. Not shown in the drawings are small vent holes which are conventionally used in molds to allow gas to escape, such as from the bottom of the bellows-like cavity surface 42 and outer surface of the mold sections 40 and 41.

The middle core members 2, 3 are rigid and have a larger, outer end diameter portion and a smaller, inner end diameter portion, each of which has a column shape. The diameter of the smaller diameter portion of the middle core members 2, 3 is smaller than the inner diameter of a tube 1. Each outer end, larger diameter portion of the middle core members 2, 3 will be in contact with mold sections 40, 41 when the mold sections are closed.

The middle core member 3 has a pair of grooves 30, 31 formed on the outer surface of the smaller diameter portion, and each groove extends around only a portion of the total circumference of the core member. The middle core member 3 also has a reverse-tapered surface 32 positioned at the transition between the smaller diameter portion and the larger diameter portion.

The middle core member 2 has a blow hole 20 in the center.

The Characteristics

An extruded tube having a cylindrical section is formed of two materials using co-extrusion molding equipment. The extruded tube is characterized by a two layered structure. The inner layer is made of fluoride rubber. The outer layer is made of nitrile rubber (NBR) or epichlorohydrin rubber (CO or ECO). The extruded tube is not vulcanized at this time. The extruded tube is cut into a segment of predetermined length.

The Inserting Step

Figure 1:
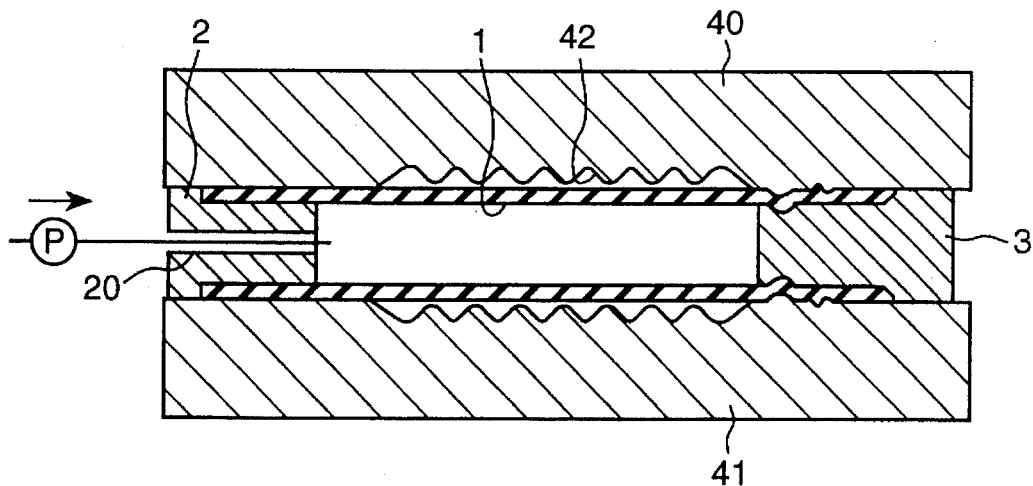
FIG. 1 is a cross-sectional view showing the mold after compressing the tube of the present invention.
Figure 2:
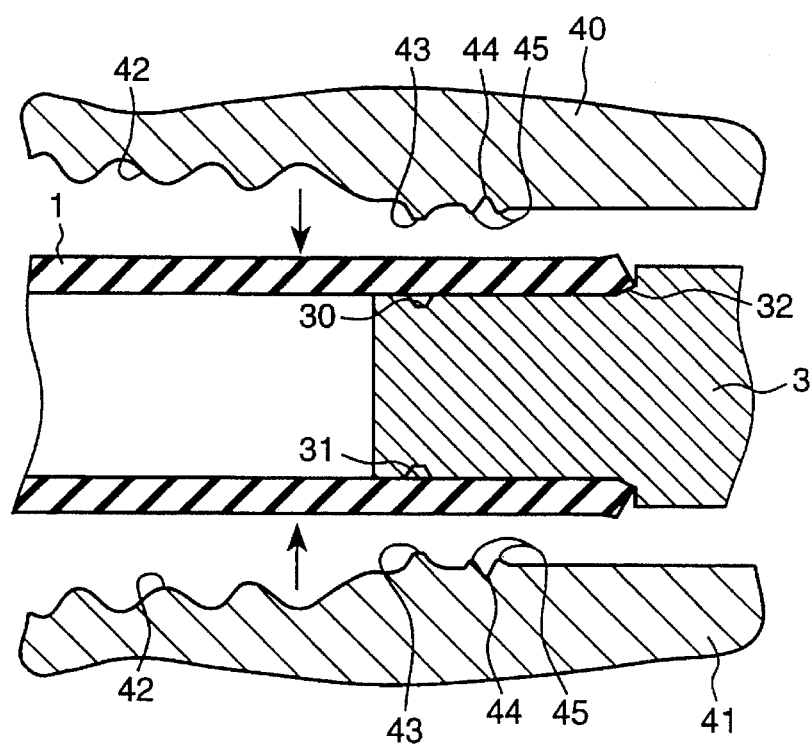
FIG. 2 is an enlarged, partial cross-sectional view of one end of the mold in FIG. 1 before compressing the tube.

As shown in FIGS. 1 and 2, the smaller diameter portion of the middle core member 2 has been inserted into one end portion of a cut tube 1. The smaller diameter portion of another middle core member 3 is inserted into the other end of the cut tube 1.

Mounting and Compressing

The cut tube 1 with the middle core members 2, 3 is mounted between the upper mold section 40 and the lower mold section 41.

As shown in FIG. 1, the pair of mold sections 40, 41 are closed. At that time, because the thickness of the cut tube 1 is thicker than the space between the outer surface of the smaller diameter portion of the middle core members 2, 3 and the inner surface of the mold sections 40, 41, both end portions of the cut tube 1 are compressed between the rigid middle core members 2, 3 and the mold sections 40, 41. Then, both end portions of the cut tube 1 are conformed to the inner surface of the mold sections 40, 41 and the outer surface of the rigid middle core members 2, 3. Consequently, molded portions 200 are formed.

Figure 3:
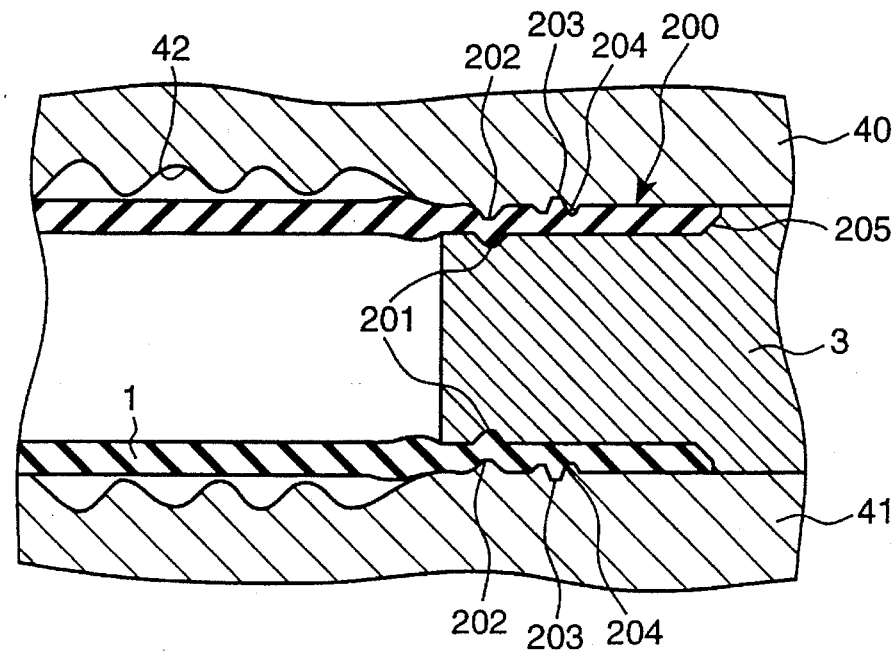
FIG. 3 is an enlarged, partial cross-sectional view as in FIG. 2 after compressing the tube.

As shown in FIGS. 2 and 3, the pair of grooves 202 are formed on the outer surface of the molded portion 200 of the cut tube 1 by being compressed against the projections 43 of the mold sections 40, 41. As a result of the compression forming, an extra volume of the tube material is forced into the grooves 30, 31 and the pair of inner ribs 201 are formed on the inner surface of the molded portion 200. Also, two pairs of shallow grooves 204 are formed on the outer surface of the molded portion 200 by being compressed by the pair of protrusions 45 of the mold sections 40, 41. In a similar fashion, an extra volume of the tube material is formed into the grooves 44, and the pair of outer ribs 203 are formed on the outer surface of the molded portion 200. Also, the tapered guide surface 205 is formed on the one opening end of the cut tube 1 by the reverse-tapered portion 32 of the middle core member 3 and the mold sections 40, 41.

The Expanding Step

Figure 4:
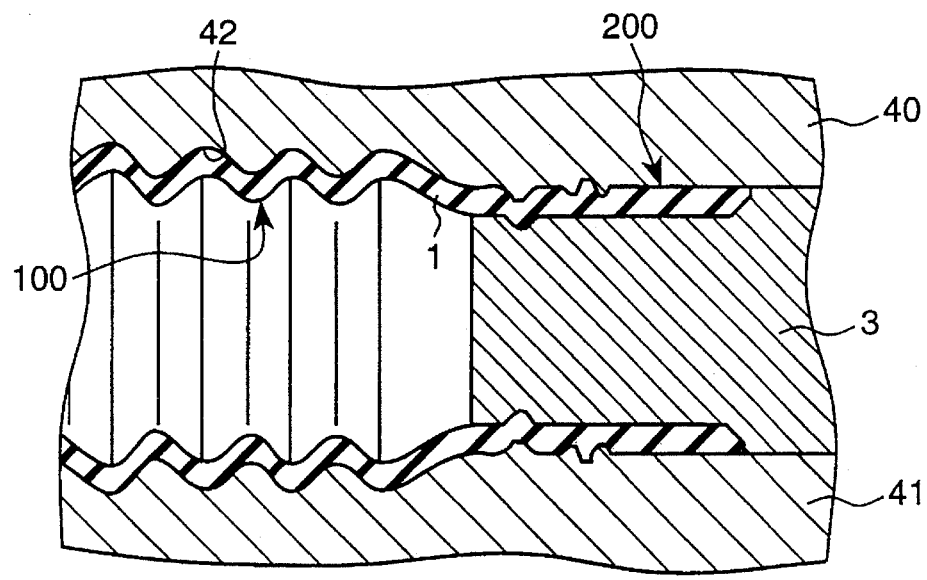
FIG. 4 is an enlarged, partial cross-sectional view as in FIG. 2 after expanding the tube.

Both end portions of the cut tube 1 are compressed and clamped between the rigid internal support, provided by the middle core members 2 and 3, and the mold sections 40, 41. This holds the tube in an airtight situation. Then, the pressurized air is introduced into the cut tube 1 through the blow hole 20 of the middle core member 2. Consequently, as shown in FIG. 4, the part of cut tube 1 which is not held by the mold sections 40, 41 in the mold cavity, such as long the center part of the tube, is expanded and forced outwardly against the cavity surface of the closed mold. This forms the bellows-like tubular portion 100 where the tube has been expanded to conform to the bellows cavity surface 42. At that time, the air between the outer surface of the cut tube 1 and the bellows-like cavity surface 42 is exhausted through the small vent holes provided in the mold sections 40, 41. Therefore, the cut tube 1 is exactly conformed to the bellows cavity surface 42, and is exactly formed to the bellows-like tubular portion 100.

Curing

Then, the cut tube 1 is vulcanized by heating while the tube remains in the closed mold cavity. Therefore, it is formed to the bellows-like tubular portion 100 and the molded portion 200, resulting in the fuel inlet hose 10, which still contains the core members 2, 3.

Part Removal

When the tube is fully vulcanized, the mold sections 40, 41 are opened and the fuel inlet hose 10, having the bellows-like tubular portion 100 and the molded portion 200 is removed. The middle core members 2, 3 are also removed from the fuel inlet hose 10.

The tapered guide surface 205 is used to guide other members such as pipe into the end. Therefore, when a pipe is connected to the fuel inlet hose 10, it is easy to insert the pipe into the hose. Also, the pair of inner ribs 201 are used for setting and positioning purposes when the pipe is inserted into the fuel inlet hose 10. Further, the pair of outer ribs 203 are used in the setting and positioning when a clamp installs on the fuel inlet hose 10, and it is easy to install.

The material for the hose can vary but preferably is nitrile rubber (NBR), epichlorohydrin rubber (CO or ECO), fluoride rubber, fluoroelastomer (FKM), polyamide (PA) resin, or a mixture of nitrile rubber (NBR) and polyvinyl chloride (PVC).

Further, if the material of the hose is rubber, curing is necessary before removing the hose from the mold. However, if the material of the hose is synthetic resin, cooling is preferable before removing the hose from the mold. Then, the hose is cooled in the mold and is formed to the predetermined shape such a bellows-like tubular shape. And if the material of the hose is synthetic resin, it is preferable to heat the tube before the compressing and expanding steps so that the tube can be easily formed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of manufacturing a hose having an expanded portion and a compression formed portion comprising the steps of:

inserting a rigid support into at least one end portion of a tube;

mounting the tube together with the rigid support in said one end portion between mold sections which define a shaped internal cavity;

closing the mold sections about the tube including the step of compressing said one end portion of the tube positioned between the mold sections and the rigid support so that a first portion of the tube is held and shaped between the rigid support and the mold sections to form protrusions or grooves in said first portion and a remaining portion of the tube is positioned in said shaped internal cavity and is not held; and expanding the remaining not held portion of the tube in the mold and forcing said remaining portion of the tube to conform to said shaped internal cavity, thereby forming said hose.

2. The method of manufacturing the hose as set forth in claim 1, providing the rigid support with a first smaller diameter portion and a second larger diameter portion, the inserting step including positioning said smaller diameter portion of the rigid support within said one end portion of the tube.

3. The method of manufacturing the hose as set forth in claim 2, wherein the larger diameter portion is dimensioned to be smaller than an outer diameter of the tube overlying the rigid support after the inserting step.

4. The method of manufacturing the hose as set forth in claim 3, including during the closing step compressing the outer diameter of the tube to the same diameter as the larger diameter portion of the rigid support.

5. The method of manufacturing the hose as set forth in claim 1, comprising the additional step of curing the tube after the expanding step.

6. The method of manufacturing the hose as set forth in claim 1, comprising the additional step of heating the tube prior to the compressing step.

7. The method of manufacturing the hose as set forth in claim 1, comprising the additional step of cooling the tube after the expanding step.

8. A method of manufacturing a hose having a tubular bellows portion and a compression formed portion comprising the steps of:

providing an extruded tube having a round cross-section and at least one end portion;

inserting a rigid support into said one end portion;

mounting the extruded tube, together with the rigid support in said one end portion, between mold sections which define therebetween at least one compression shaping end portion and an internal bellows shaping mold cavity;

compressing and shaping said one end portion that is positioned between the rigid support and the compression shaping end portion of the mold sections to form protrusions or grooves on said one end portion;

expanding an intermediate area of the extruded tube in the shaping mold cavity and forcing the intermediate area to conform to the shape of the bellows shaping mold cavity to thereby form a shaped tube; and removing the shaped tube from the mold sections as said hose having said tubular bellows portion and said compression formed portion.

9. The method of manufacturing the hose as set forth in claim 8, comprising the additional step of vulcanizing the tube between the expanding and removing steps.

10. The method of manufacturing the hose as set forth in claim 1, wherein the step of compressing includes forming a pair of protrusions on an outer surface of the hose.

11. The method of manufacturing the hose as set forth in claim 1, wherein the step of compressing includes forming a pair of grooves on an outer surface of the hose.

12. The method of manufacturing the hose as set forth in claim 1, wherein the step of compressing includes forming a pair of protrusions on an inner surface of the hose.

13. The method of manufacturing the hose as set forth in claim 1, wherein the step of compressing includes forming a tapered guide surface at an inner surface of an opening at said one end portion.

14. The method of manufacturing the hose as set forth in claim 8, wherein the step of compressing includes forming a pair of protrusions on an outer surface of the hose.

15. The method of manufacturing the hose as set forth in claim 8, wherein the step of compressing includes forming a pair of grooves on an outer surface of the hose.

16. The method of manufacturing the hose as set forth in claim 8, wherein the step of compressing includes forming a pair of protrusions on an inner surface of the hose.

17. The method of manufacturing the hose as set forth in claim 8, wherein said compressing and shaping forms a tapered guide surface at an inner surface of an opening at said one end portion.

* * * * *